US006509925B1

(12) United States Patent
Dermler et al.

(10) Patent No.: US 6,509,925 B1
(45) Date of Patent: Jan. 21, 2003

(54) CONFERENCING SYSTEM

(75) Inventors: Gabriel Dermler, Adliswil (CH); Claudio Fleiner, San Jose, CA (US); Marcel Graf, Kilchberg (CH); Lukas S. Heusler, Zurich (CH); Hong Linh Truong, Richterswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/492,626

(22) Filed: Jan. 27, 2000

(30) Foreign Application Priority Data

Jan. 29, 1999 (EP) .............................. 99101911

(51) Int. Cl.[7] ................................. H04N 7/12
(52) U.S. Cl. ................. 348/14.09; 348/14.12
(58) Field of Search .................. 348/14.08–14.11, 348/14.01, 14.16

(56) References Cited

U.S. PATENT DOCUMENTS 5,740,161 A    4/1998  Porter et al. ............... 370/260
5,963,547 A  * 10/1999  O'Neil et al. ............ 348/14.09

FOREIGN PATENT DOCUMENTS

WO    PCTUS9806447    4/1998

OTHER PUBLICATIONS

W. J. Clark. "Protocols for Multimedia Conferencing—An Introduction to the ITU–T T.120 series."
Gary A. Thom. "H.323: The Multimedia Communications Standard for Local Area Networks." IEEE Communications Magazine, Dec. 1996.

* cited by examiner

*Primary Examiner*—Wing Chan
(74) *Attorney, Agent, or Firm*—Douglas W. Cameron; Anne Vachon Dougherty

(57) ABSTRACT

A distributed multipoint conferencing system (3) comprises a plurality of participating terminals (31;32;33) for sending and receiving media streams in a conferencing interchange; the system further includes at least one multipoint distributor (30) (MD) connected to one terminal (31) for receiving at least one or all media streams from that terminal (31) but not from any other of the participating (32;33); the multipoint distributor (30) is connected to the other participating terminals (32;33) for sending the media stream or streams received from the MD-associated terminal (31) to the other participating terminals (32;33).

21 Claims, 1 Drawing Sheet

CONFERENCING SYSTEM

FIELD OF THE INVENTION

The present invention generally relates to the exchange of electronic data between a plurality of terminals and specifically to distributed multipoint conferencing.

BACKGROUND OF THE INVENTION

According to the present industrywide accepted standard for multimedia conferencing over packetbased networks, i.e. the ITUT Recommendation H.323 (also termed H.323 standard for short) a distinction is made between differing types of multipoint conferencing, depending upon the way in which media streams are distributed, namely either centralized multipoint conferencing or distributed multipoint conferencing. The term "media stream" as used herein is intended to refer to audio streams, video streams, text streams, shared object streams (e.g. shared window streams), shared remote pointer streams and the like bit streams that are connected with conferencing.

In centralized multipoint conferencing all participating terminals send their media streams to a multipoint processor (MP) via unicast (pointtopoint) deliveries. The multipoint processor processes, (i.e. mixes or switches) all media streams received from the terminals and sends the resulting streams back to the terminals. In the case of audio media streams, signals sent from a terminal cannot be sent back to that source because of echo problems. That is one reason why MP implementations tend to be complex and expensive.

In distributed multipoint conferencing, on the other hand, all participating terminals send their media streams to all other participating terminals, and each terminal does its own mixing and/or switching of the media streams. Thus, there is no need for a multipoint processor. The terminals can send their media streams to the other terminals either via a multicast delivery (assuming that the network supports multicast) or via multiple unicast deliveries (multiunicast) if the network does not support multicasting.

In addition to these two methods, the H.323 standard specifies a hybrid-type multipoint conferencing in which the centralized approach applies to some media streams while the distributed approach applies to other streams. For example, audio streams are distributed directly to the terminals while video data streams are processed by a central video multipoint processor.

In addition to the specifications for media streams, the H.323 Recommendation also specifies the control architecture of a multipoint conference. Participating terminals communicate only via a multipoint controller (MC) which serves, inter alia, to invite and add new participants, to select the appropriate media codecs, to determine media distribution methods, and to inform the terminals of the addresses to be used for sending and receiving media streams.

When comparing the two multipoint conferencing methods just mentioned, the distributed approach has the advantage of not requiring an expensive MP. Furthermore, it scales well for large numbers of conferences because of its distributed structure. However, the number of participants within a conference is limited by the number of media streams which a terminal can process in parallel, and by the total network capacity consumed by the distribution of the media streams. The second limiting factor becomes critical when the network is accessed by a terminal via a low capacity link, and when multiunicast is to be used, e.g. because multicast is not supported by the network; this latter condition currently is the case with the majority of IPbased networks.

For a distributed multiunicast conference with N participating terminals, a terminal is required to send its media streams to the other (N−1) terminals and also to receive the streams sent by those (N−1) terminals. Consequently, the capacity required for a specific media by a terminal on its access link is B=2*(N1)*b, with b representing the capacity required by a single stream.

Assuming that a terminal accesses the network via a standard-type 28.8 kbit/s modem and G.723 is used for audio: with a G.723 audio stream consuming 6 kbit/s, such a terminal would be able to participate in an audio conference with only three parties.

Accordingly, a primary object of the present invention is to provide for a new distributed conferencing system and method capable of significantly reducing the link capacity required for one or more of the participating terminals.

SUMMARY OF THE INVENTION

This object and further advantages that will become apparent as this specification proceeds are achieved, in a first general embodiment of the present invention by a distributed multipoint conferencing system formed by a plurality of participating terminals for sending and receiving media streams in a conferencing interchange; the system further including at least one multipoint distributor (MD) connected to one of the terminals for receiving at least one or all of the media streams from that terminal but not from any other of the participating terminals; the multipoint distributor, on the other hand, is connected to the other participating terminals only for sending to them the media stream, or media streams, that it receives from its associated terminal; the other participating terminals receive additional media streams directly from any of the other participating terminals. In other words, any terminal that is associated with an MD, sends at least one or all of its media streams to the MD while it receives media streams either directly from the other terminals or from other MDs. By the same token, any terminal that is not associated with an MD in this manner sends its media streams directly, i.e. not via an MD, to all other terminals. Typically, up to ten terminals can participate in a conferencing system according to the invention and one, or more, or all of the terminals, can be associated with an MD of their own. As a matter of practice, an MD could be implemented in any general-purpose computer that includes a networking sub-system.

According to a preferred embodiment of the invention, the system includes high capacity linked terminals (HCL-terminals) mutually interconnected for sending and receiving media streams while the at least one terminal that is connected with the multipoint distributor is a low capacity linked terminal (LCL-terminal). However, connection of the multipoint distributor to an LCL-terminal is not a critical requirement. On the other hand, a conferencing system according to the invention may include more than one multipoint distributor in which case each multipoint distributor receives at least one media stream from its associated terminal; by the same token, all terminals of the system could be connected to, or supplied with, an associated multipoint distributor.

According to a further embodiment, the present invention provides for a distributed multipoint conferencing method between a plurality of participating terminals for sending and receiving media streams in a conferencing interchange;

the method further including providing at least one multipoint distributor connected to one of the terminals for receiving at least one media stream from its associated terminal but not from any other of the participating terminals; the multipoint distributor being connected to the other participating terminals for sending to them the media stream or media streams received from its MD-associated terminal. The other participating terminals may also receive additional media streams directly from any of the other participating terminals.

Again, the conferencing method according to the invention may include one or more HCL-terminals and one or more LCL-terminals, wherein any LCL terminal is associated with its multipoint distributor.

BRIEF DESCRIPTION OF THE DRAWINGS

The invention will be discussed in more detail with reference to the enclosed drawings intended to illustrate the invention without limiting it. In the drawings.

DETAILED DESCRIPTION OF THE INVENTION

Figure 1:
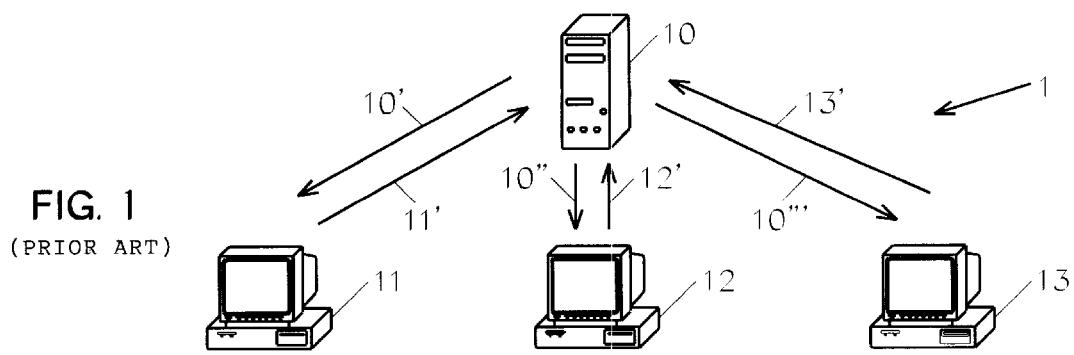
FIG. 1 is a diagrammatic view of a prior art centralized multipoint conferencing system including a number of terminals linked via modem/telephone connections to a common multipoint processor.

The inventive system and method will now be discussed in more detail with reference to the figures. Therein, FIG. 1 is a diagrammatic illustration of centralized multipoint conference system 1 according to the art as defined by the H.323 standard. It includes a number of terminals 11, 12, 13 etc. each of which is linked to a multipoint processor 10. It is to be noted that the number of terminals could be smaller or greater than shown in FIG. 1. While only one pair of arrows 10',11'; 10",12'; and 10"', 13' is shown between multipoint processor 10 and terminals 11, 12, and 13, respectively, this does by no means imply that only one media stream is sent in each direction but that any number of media streams, in line with conferencing requirements and system capacities, is exchanged. It is to be noted however, that currents for transmitting media streams 10', 10", and 10"' emanating from multipoint processor 10 are not identical but different for each participating terminal 11, 12, and 13.

Figure 2:
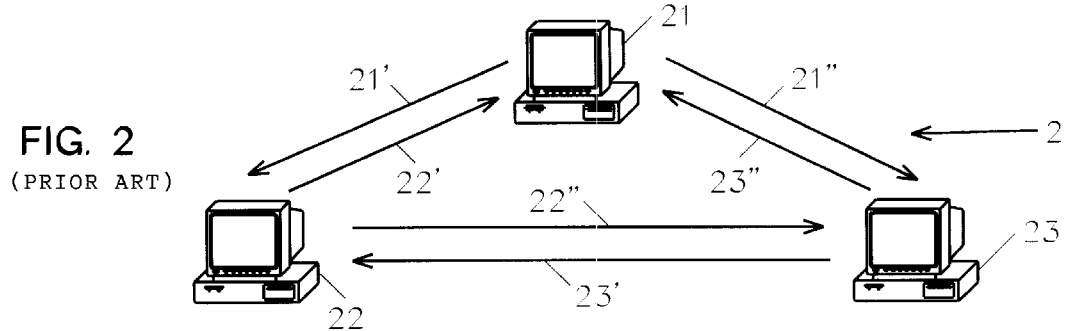
FIG. 2 is a diagrammatic view of another prior art system for distributed multipoint conferencing by way of multi-unicast.

FIG. 2 illustrates another prior art system according to the H.323 standard, i.e. a distributed multipoint conference system (multi-unicast) 2 formed of a number of terminals 21, 22, 23 which send their media streams 21', 21", 22', 22", 23', 23" directly to each other. The exact number of terminals again is not limited to three terminals as shown in FIG. 2 and, again, each arrow pair 21',22'; 22",23'; and 21",23" may represent any number of media streams in line with conferencing requirements and system capacities.

Figure 3:
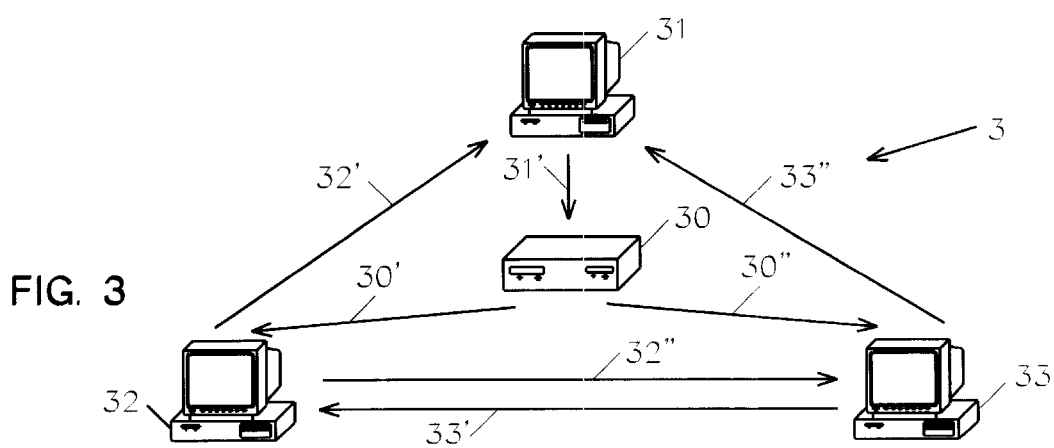
FIG. 3 is a diagrammatic view of a distributed multipoint conferencing system according to the present invention.

FIG. 3 is a diagrammatic illustration of a distributed multipoint conferencing system 3 according to the invention formed by a plurality of terminals 31, 32,33 with terminal 31 being associated with a multipoint distributor 30. Again, the exact number of terminals is not limited to three terminals as shown in FIG. 3 and, here again, each arrow 30', 30", 31', 31", 32', 32",33', and 33" may represent any number of media streams in line with conferencing requirements and system capacities. It is to be noted however, that the currents or media streams 30', 30" emanating from multipoint distributor 30 are the same as data stream 31' that is sent from terminal 31 to multipoint distributor 30.

As in the conventional distributed conferencing system, all participating terminals 32, 33, except terminal 31 associated with the multipoint distributor 30, send their media streams 32', 32", 33', 33" directly to the other terminals. Terminal 31 gets support from the multipoint distributor 30. Instead of sending (N−1) media streams, terminal 31 sends only a single stream 31' to its MD 30. MD 30 will then redistribute the stream 31' further to the other terminals 32, 33 via the streams 30', 30".

The multipoint distributor 30 distributes a media stream in the following manner: it receives a piece or portion of media data from a terminal, puts the data into a buffer and sends the buffered data to each other terminal. It repeats the procedure for each piece of received media data. The multipoint distributor 30 could, for example, be implemented as a piece of hardware, e.g. a chip, or as a piece of software in a general-purpose computer with a networking sub-system.

No media processing is done by the MD and every terminal 31,32,33 still receives all (N−1) streams sent by the other and process them locally. As a consequence, the advantage of the distributed system will be preserved, because no complex multiprocessor is required as in system 1 (FIG. 1). The system and method according to the invention are scaleable for a large number of conferences because the MD 30 is quite simple to implement since it redistributes only those media streams which it receives from the associated terminal 31 to the rest of the terminals 32, 33 etc.

Because any terminal 31 sends only its streams to its associated MD 30 (instead of to all other terminals), the capacity required by a terminal for a single media is reduced from $2*(N-1)*b$ to $N*b$.

Taking as an example a terminal 31 with a 28.8 kbit/s modem, this terminal would be able to participate in a four party audio conference. It is to be noted, however, that if it participates in a three party conference using the distributed multipoint conferencing system 3 according to the invention or the corresponding method embodiment, some capacity would remain available for other applications. In contrast, a conventional distributed system 2 would consume the entire capacity of the access link.

The distributed multipoint conferencing system according to the invention and method is very attractive for asymmetric access configurations, with little capacity on the up-link to the network and large capacity in the opposite direction, e.g. ADSL (asynchronous digital subscriber), or for hybrid accesses with normal modem for up-link and cable modem for down-link. In these situations, the limited up-link capacity is only used by the terminal to send its streams to its MD while it receives the (N−1) streams sent by the other terminals via its down-link.

It is to be noted that a MD is only required for those terminals that require support, i.e. the LCL-terminals and not the HCL-terminals.

With the H.323 standard with its centralized control architecture, a terminal can inform the MC about its need for an MD during the H.245 capability exchange phase. The MC will then create the required MD accordingly and instruct the requesting terminal to send its media to the created MD. For example, the MD can be hosted by the same device which contains the MC of the conference, or as close as possible to the LCL-terminal that requires it, or somewhere in the network based on conventional optimization rules, e.g. as close as possible to the receivers.

The following specific, but not limiting, example illustrates how the invention can be used in a conference by means of a conferencing system with three participating terminals T1, T2, T3 and a multipoint distributor MD. While terminals T1 and T2 send their media streams directly to the other terminals, terminal T3 uses the multipoint distributor to distribute its media streams to terminals T1 and T2.

Assuming the terminals use the procedures defined in H.323 to set up a conference call on an IP network, one possibility to create a conference is to start with a point-to-point call between T1 and T2 and expand it into a conference, the so-called ad-hoc conference expansion. Assuming T1 invites T2, and assuming T1 has been elected Master, following the H.323 Master/Slave determination procedure, T1 creates an MC which has a signaling connection to itself and T2. T1 then starts the H.323 invitation procedure by tunneling a signaling connection through the MC to T3. T3 follows the H.323 procedure to accept the invitation. Assuming the H.245 messages for capability description have been extended to describe the capability of a terminal to use a multipoint distributor and, assuming T3 advertises such a capability in its TerminalCapabilitySet message, the MC learns about that capability. When the H.323 invitation procedure completes successfully, T3 starts the H.323 procedure to open a logical channel for a media stream by sending an OpenLogicalChannel message to the MC. The MC then sends an OpenLogicalChannel message to T1 and T2. T1 prepares itself to receive a media stream and sends the transport address where it is listening for the media stream to the MC in an OpenLogicalChannelAck message. The same happens for T2. The MC then instructs the multipoint distributor with a signaling message to receive the media stream from T3 and to distribute it to T1 and T2. The multipoint distributor acknowledges that request and informs the MC about the transport address where it listens for media data with a signaling message. The MC sends an OpenLogicalChannelAck message to T3 to inform it that it needs to send the media stream to the multipoint distributor. Then T3 starts to send media data to the multipoint distributor which distributes it to T1 and T2 as previously described.

Generally, the invention provides for a distributed conferencing system and method in which the media streams (e.g. audio, video) are mixed or switched by the participating terminals themselves. This is of particular advantage in the case of conferences with a small number of participants (typically up to 5, 6 or 7) because it does not require the assistance of an expensive multipoint processor. The trade-off consists in the fact that a distributed conferencing system according to the art requires substantially more network capacity than a centralized system, which becomes a problem whenever a conferencing participant accesses the network via a low capacity link. This disadvantage of prior art distributed conferencing systems can be substantially reduced with the system and method according to the invention which reduces the required capacity to roughly half of the capacity required by distributed conferencing systems according to prior art.

Many modifications of the system and method disclosed herein will be apparent to those experienced in the art. For example, the telephone connection could be effected by wire or by wireless transmission. Generally, any type of interconnection between the terminals that provides the required data transmission capacity is applicable and the scope of the invention is to be construed on the basis of the following claims.

Having thus described the invention, what is claimed is:

1. A distributed multipoint conferencing system comprising:
   a plurality of participating terminals for sending and receiving media streams in a conferencing interchange; and
   at least one multipoint distributor, wherein each of said at least one multipoint distributor is connected to a connected one terminal of said plurality of participating terminals and is adapted for receiving at least one of said media streams exclusively from said connected one terminal and for sending said at least one media stream received from said connected one terminal to the other of said plurality of participating terminals.

2. The system of claim 1 wherein said plurality comprises at least 3 participating terminals.

3. The system of claim 1 wherein each of said at least one multipoint distributor in the system is implemented in a general-purpose computer with a networking system.

4. The system of claim 1 wherein at least one of said plurality of participating terminals is a high capacity linked terminal while at least one other of said plurality of participating terminals is a low capacity linked terminal.

5. The system of claim 2 wherein at least one of said plurality of participating terminals is a high capacity linked terminal while at least one other of said plurality of participating terminals is a low capacity linked terminal.

6. The system of claim 3 wherein at least one of said plurality of participating terminals is a high capacity linked terminal while at least one other of said plurality of participating terminals is a low capacity linked terminal.

7. A distributed multipoint method for conferencing of a plurality of participating terminals sending and receiving media streams in a conferencing interchange, said method comprising the steps of:
   providing a first multipoint distributor connected to a first one terminal of said plurality of participating terminals;
   said first multipoint distributor receiving at least one of said media streams exclusively from said first one terminal; and
   said first multipoint distributor sending said at least one media stream received from said first one terminal to the other of said plurality of participating terminals.

8. The method of claim 7 further comprising the steps of:
   providing a plurality of successive multipoint distributors, each of said plurality of successive multipoint distributors being connected to a successive one of said plurality of participating terminals;
   at each of said successive multipoint distributors receiving at least one of said media streams exclusively from said successive one of said participating terminals; and
   at each of said successive multipoint distributors sending said at least one media stream received from said successive one terminal to the other of said plurality of participating terminals.

9. The method of claim 7 further comprising, at said other of the plurality of participating terminals, the steps of:
   receiving at least one media stream from said multipoint distributor connected to said connected one terminal; and
   additionally receiving media streams directly from at least one of said other participating terminals and other multipoint distributors associated with other participating terminals.

10. The method of claim 8 further comprising, at said other of the plurality of participating terminals, the steps of:

receiving at least one media stream from said multipoint distributor connected to said connected one terminal; and additionally receiving media streams directly from at least one of said other participating terminals and other multipoint distributors associated with other participating terminals.

11. A method for a multipoint controller in a distributed multipoint conferencing system comprising a plurality of participating terminals to facilitate communications among said terminals comprising the steps of:

receiving communications capability information from each of said plurality of terminals;

identifying at least one low capacity linked terminal among said participating terminals; and instructing at least one multipoint distributor, a dedicated one multipoint distributor for each of said at least one low capacity linked terminals, to receive media streams from said at least one low capacity linked terminal and to send said media streams to said other of said participating terminals.

12. The method of claim 11 further comprising the steps of:

receiving a transport address from each of said at least one low capacity linked terminals; and relaying said transport address to each said dedicated one multipoint distributor.

13. A method for a multipoint distributor to send and receive media streams in a distributed multipoint conferencing system formed by a plurality of participating terminals for sending and receiving media streams in a conferencing interchange, said method comprising the steps of:

receiving at least one media stream exclusively from a connected one of said plurality of participating terminals;

buffering to provide temporary storage of said at least one media stream; and transmitting said at least one media stream from said buffer to the other of said plurality of participating terminals.

14. The method of claim 7 wherein one of said other of said plurality of participating terminals is elected as the multipoint controller for said conference and wherein said providing a first multipoint distributor comprises for said multipoint controller the steps of:

receiving communications capability information from said first one terminal, said communications capability information indicating a need for a first multipoint distributor;

creating a first multipoint distributor; and instructing said first one terminal to send its media streams to said first multipoint distributor.

15. The method of claim 8 wherein one of said other of said plurality of participating terminals is elected as the multipoint controller for said conference and wherein said providing a plurality of successive multipoint distributors comprises for said multipoint controller the steps of:

receiving communications capability information from said successive ones of said plurality of participating terminals, said communications capability information indicating a need for a multipoint distributor at each of said successive ones of said plurality of participating terminals;

creating a plurality of successive multipoint distributors, one for each of said successive ones of said plurality of participating terminals for which communications capability information indicates a need for a multipoint distributor; and instructing each of said successive ones of said plurality of participating terminals to send its media streams to a dedicated one of said successive multipoint distributors.

16. The method of claim 14 wherein said multipoint distributor is created at said multipoint controller.

17. The method of claim 7 wherein said multipoint distributor is created at a high capacity linked terminal.

18. The method of claim 14 wherein said multipoint distributor is created at a high capacity linked terminal.

19. The method of claim 15 wherein each successive multipoint distributor is created at said multipoint controller.

20. The method of claim 15 wherein each successive multipoint distributor is created at a high capacity linked terminal.

21. A multipoint distributor for use in a distributed multipoint conferencing system formed by a plurality of participating terminals which send and receive media streams in a conferencing interchange, said multipoint distributor comprising:

receiving means for receiving at least one media stream exclusively from a connected one of said plurality of participating terminals;

buffer means for providing temporary storage of said at least one media stream; and transmitting means for sending said at least one media stream from said buffer to the other of said plurality of participating terminals.

* * * * *